US012778836B2

(12) United States Patent
Matsuda et al.

(10) Patent No.: US 12,778,836 B2
(45) Date of Patent: Nov. 3, 2026

(54) REHABILITATION ASSISTANCE SYSTEM, PROGRAM, AND CONTROL DEVICE

(71) Applicant: THE UNIVERSITY OF KITAKYUSHU, Fukuoka (JP)

(72) Inventors: Tsuruo Matsuda, Fukuoka (JP); Junya Kaneda, Fukuoka (JP)

(73) Assignee: THE UNIVERSITY OF KITAKYUSHU, Fukuoka (JP)

( * ) Notice: Subject to any disclaimer, the term of this patent is extended or adjusted under 35 U.S.C. 154(b) by 467 days.

(21) Appl. No.: 18/557,368

(22) PCT Filed: Apr. 26, 2022

(86) PCT No.: PCT/JP2022/018900
§ 371 (c)(1),
(2) Date: Oct. 26, 2023

(87) PCT Pub. No.: WO2022/230881
PCT Pub. Date: Nov. 3, 2022

(65) Prior Publication Data

US 2024/0374463 A1 Nov. 14, 2024

(30) Foreign Application Priority Data

Apr. 27, 2021 (JP) ................................ 2021-074696

(51) Int. Cl.
*A61H 9/00* (2006.01)
*A61H 1/02* (2006.01)

(52) U.S. Cl.
CPC ........... *A61H 9/005* (2013.01); *A61H 1/0288* (2013.01); *A61H 2201/1238* (2013.01); *A61H 2201/5043* (2013.01); *A61H 2201/5056* (2013.01); *A61H 2201/5064* (2013.01)

(58) Field of Classification Search
CPC .................. A61H 9/005; A61H 1/0288; A61H 2201/1238; A61H 2201/5043; A61H 2201/5056; A61H 2201/5064; A61H 2201/5035; A61H 2201/5048;
(Continued)

(56) References Cited

U.S. PATENT DOCUMENTS

2015/0199045 A1 7/2015 Robucci et al.

FOREIGN PATENT DOCUMENTS

JP 2009-112578 A 5/2009
JP 2016-97238 A 5/2016
JP 2016097238 A * 5/2016
(Continued)

OTHER PUBLICATIONS

First Office Action issued by the Japan Patent Office on Jan. 26, 2024 for Japanese Patent Application No. 2021-074696.

*Primary Examiner* — Tarla R Patel
(74) *Attorney, Agent, or Firm* — Taro Yaguchi

(57) ABSTRACT

Provided are a rehabilitation assistance system, program, and control device having high therapeutic efficacy. A rehabilitation assistance system 10 comprises an assistive unit 12 for applying force to move a paralyzed part of a patient whose body is partially paralyzed, a sensor unit 14 for detecting movement of an unaffected part corresponding to the paralyzed part, and a drive control unit 162 for controlling the assistive unit 12 according to the movement of the unaffected part detected by the sensor unit 14.

14 Claims, 6 Drawing Sheets

(58) Field of Classification Search
CPC .......... A61H 1/0274; A61H 2201/5007; A61H 2201/5061; A61H 2201/5071; A61H 1/02
See application file for complete search history.

(56) References Cited

FOREIGN PATENT DOCUMENTS

| | | | |
|---|---|---|---|
| JP | 2016-158057 | A | 9/2016 |
| JP | 2018-29728 | A | 3/2018 |

* cited by examiner

REHABILITATION ASSISTANCE SYSTEM, PROGRAM, AND CONTROL DEVICE

FIELD OF THE INVENTION

The present invention relates to a rehabilitation assistance system, a program, and a control device.

BACKGROUND OF THE INVENTION

Conventionally, individuals with hemiplegia caused by stroke or the like undergo rehabilitation by wearing, on the paralyzed hand, an assistive glove or finger orthosis that moves the fingers. Conventional rehabilitation has generally consisted of the repetition of monotonous movements independent of the patient's volition, and is not sufficiently effective in providing feedback to the motor cortex of the cerebral cortex, i.e., in contributing to the formation of new motor pathways. As such, rehabilitation is not always highly efficient.

Patent document 1 discloses a rehabilitation apparatus by which a patient who has paralyzed motor function in part of the body and has difficulty in transmitting motor volition along the motor pathways as motor commands can perform training to establish motor pathways along which transmission can be effect.

This rehabilitation apparatus comprises a presentation unit that provides visual prompts to the patient, a drive unit that uses external force to perform an assistive movement that aids in moving a paralyzed part of the patient's body, and a control unit that causes the drive unit to perform the assistive movement according to patient brain waves. The presentation unit presents an image including at least a target part that is identical to the paralyzed part, in a resting state. The control unit uses variation in the spectrum intensity of a specific frequency band within the signals that makes up brain waves as a criterion for deciding whether to cause the drive unit to perform the assistive movement.

PRIOR ART DOCUMENTS

Patent Documents

Patent document 1: JP 2018-29728 A

SUMMARY OF THE INVENTION

An object of the present invention is to provide a rehabilitation assistance system, a program, and a control device that have high therapeutic efficacy.

A rehabilitation assistance system according to one embodiment of the present invention comprises an assistive unit for applying force to move a paralyzed part of a patient whose body is partially paralyzed, a sensor unit for detecting movement of an unaffected part corresponding to the paralyzed part, and a drive control unit for controlling the assistive unit according to the movement of the unaffected part detected by the sensor unit.

A program according to one embodiment of the present invention causes a control device of a rehabilitation assistance system comprising an assistive unit for applying force to move a paralyzed part of a patient whose body is partially paralyzed and a sensor unit for detecting movement of an unaffected part corresponding to the paralyzed part to function as a control means for controlling the assistive unit according to the movement of the unaffected part detected by the sensor unit.

A control device of a rehabilitation assistance system according to one embodiment of the present invention comprises an assistive unit for applying force to move a paralyzed part of a patient whose body is partially paralyzed and a sensor unit for detecting movement of an unaffected part corresponding to the paralyzed part, wherein the control device controls the assistive unit according to the movement of the unaffected part detected by the sensor unit.

In accordance with the present invention, it is possible to provide a rehabilitation assistance system, a program, and a control device that have high therapeutic efficacy.

DETAILED DESCRIPTION OF THE INVENTION

Next, an embodiment of the present invention will be described with reference to the attached drawings to add in understanding the present invention. Parts not relevant to the description may be omitted from the illustrations.

Figure 1:
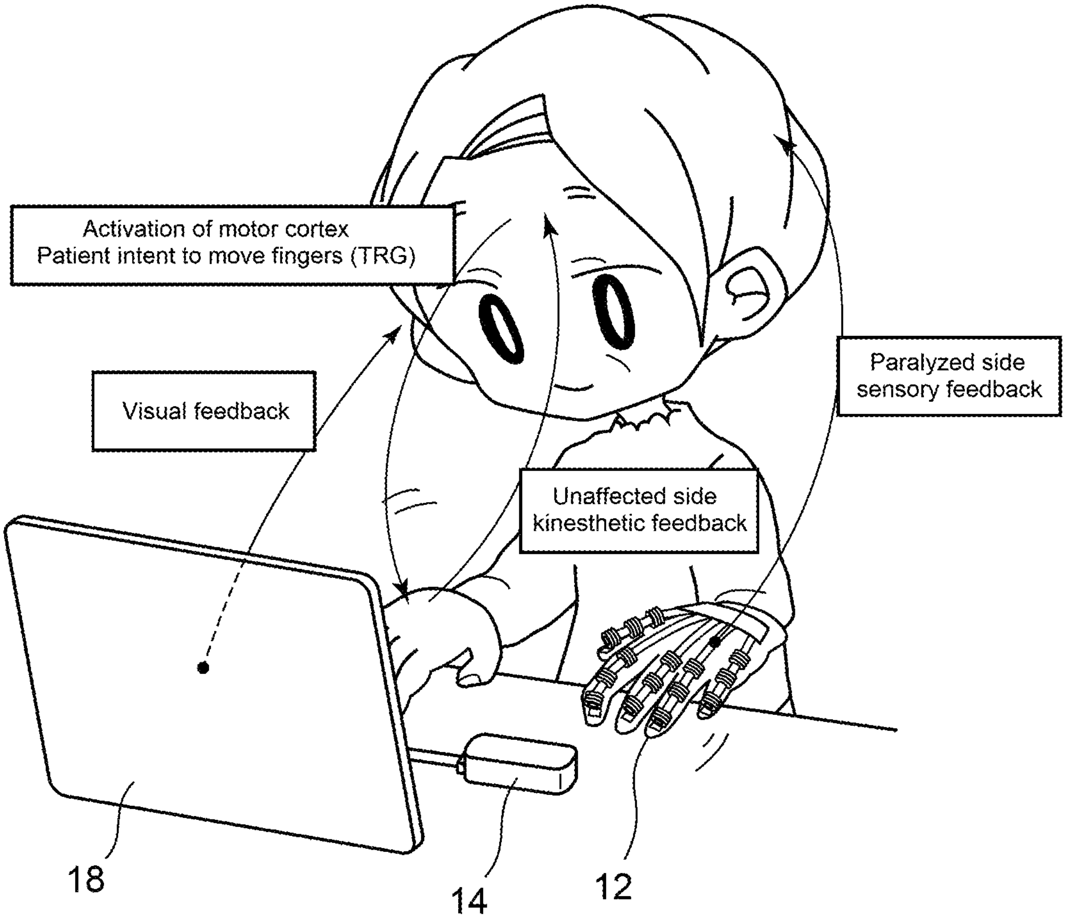
FIG. 1 is an illustration of a rehabilitation assistance system according to one embodiment of the present invention.

A rehabilitation assistance system 10 according to one embodiment of the present invention is a system for assisting in the rehabilitation of a hemiplegic patient having a case of paralysis in a part of the body constituted by the fingers on one side of the body. Examples of cases of paralysis include tremor disorders in which microtremors occur due to neurotransmitter deficiencies or contracture of the fingers. As shown in FIG. 1, the rehabilitation assistance system 10 is capable of promoting recovery of function in the paralyzed fingers by feeding (1) kinesthetic sensation from volitional movement of the functional unaffected fingers by the patient, (2) sensation of the paralyzed (affected) fingers, and (3) visual sensation from visually perceiving movement of the unaffected fingers and the paralyzed fingers back to the patient's brain.

Figure 2:
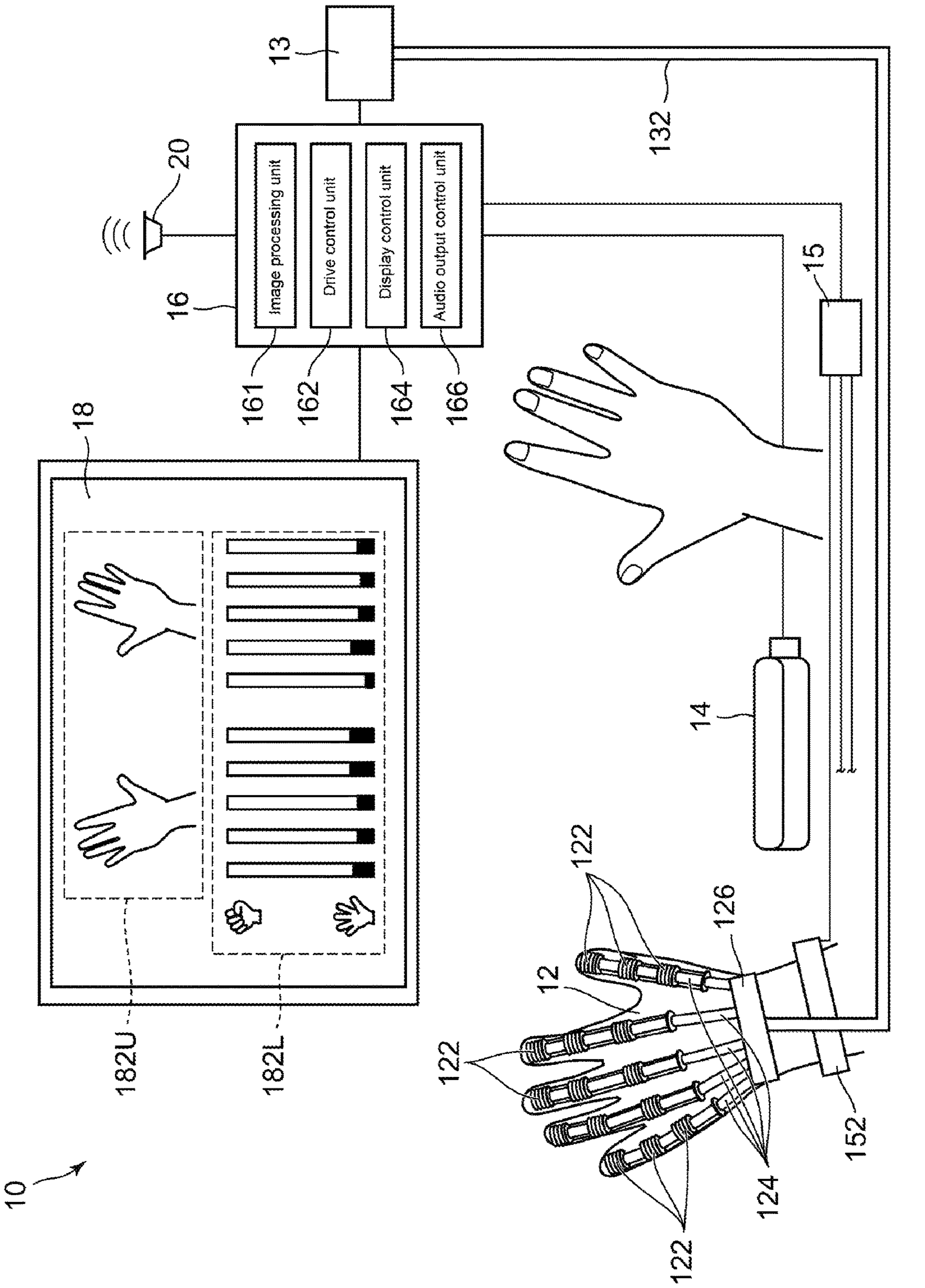
FIG. 2 is a schematic diagram of the rehabilitation assistance system.

As shown in FIG. 2, the rehabilitation assistance system 10 comprises a glove 12, a glove drive device 13, a sensor unit 14, a stimulation device 15, a control device 16, a display device 18, and a speaker 20.

The glove (an example of an assistive unit) 12 is worn on the paralyzed fingers (an example of a paralyzed part), and is capable of applying force to move the fingers.

The power source of the glove 12 is pneumatic pressure. Using pneumatic pressure as a power source results in a lighter, more flexible glove and places less of a burden upon the patient being treated than if a motor were used as a power source.

The glove 12 covers the entire dorsal side of the hand and the fingers, and comprises bellows (air bags) 122 and tubes 124. The bellows 122 are provided at a total of 15 locations on the dorsal side of the hand corresponding to the joints of the fingers. The tubes 124 extend along the fingers to the tips from a manifold 126 provided on the dorsal side of the wrist to form an air supply path having three bellows connected in series per finger. The bellows 122 expand or contract according to the pressure within the tubes 124, enabling the glove 12 to apply force to flex and extend the joints of the hand.

The glove drive device 13 is a power source for supplying pneumatic pressure to the glove 12. Pneumatic pressure is supplied to the glove 12 through a tube 132 extending from the manifold 126. The glove drive device 13 is connected to the control device 16, and is capable of driving the glove 12 by increasing or decreasing the pressure within the tubes 124 via the tube 132 according to a control signal (command signal) outputted by the control device 16.

The sensor unit 14 comprises an irradiator (not shown) that emits infrared radiation and two infrared cameras (not shown), and is capable of acquiring camera images of the movement of the unaffected fingers (an example of an unaffected part) and the paralyzed fingers wearing the glove 12 as sensor information. The sensor information also includes spatial coordinates for the fingers and palm obtained by processing the camera images within the sensor unit 14.

The stimulation device 15 is an external magnetic device or electrostimulation device used for medical purposes, and comprises a plurality of stimulating parts 152 that are worn, for example, on the patient's carpal region, forearm, upper arm, etc., to apply stimulation thereto. In FIG. 2, only the stimulating part 152 worn on the carpal region is shown, with the other stimulating parts being omitted.

The stimulation device 15 is controlled by the control device 16, and is capable of driving the stimulating parts 152 via cables.

When a trigger signal is received from the control device 16, the stimulation device 15 drives stimulating parts 152, thereby stimulating the locations at which the stimulating parts 152 are worn. As a result, the stimulation device 15 can provide the patient with stimulation to relieve contracture of the paralyzed fingers. The stimulation device 15 can also apply stimulation according to a preset pattern.

The control device 16 is connected to the glove drive device 13, the sensor unit 14, and the stimulation device 15, and is capable of controlling the operation of the glove 12, displaying an image on the display device 18, and outputting sound from the speaker 20. The control device 16 is, for example, a personal computer, and comprises an image processing unit 161, a drive control unit 162, a display control unit 164, and an audio output control unit 166.

The image processing unit 161 is capable of obtaining the movement of the unaffected fingers and the paralyzed fingers as first data and second data by processing the sensor information sent from the sensor unit 14. The first data is at least one of coordinates for the centers of each of the bones that make up the fingers (the distal phalanges, intermediate phalanges, proximal phalanges, and metacarpals) and coordinates for the ends of each bone. The second data is longitudinal vectors for each of the bones.

The drive control unit 162 is capable of outputting a control signal to the glove drive device 13 to control the operation of the glove 12 according to the movement of the unaffected fingers. The drive control unit 162 also outputs a trigger signal to the stimulation device 15 according to the movement of at least one of the unaffected fingers and the paralyzed fingers. As a result, the stimulation device 15 is capable of providing stimulation to the patient via the stimulating part 152 to relieve contracture of the paralyzed fingers.

The display control unit 164 is capable of generating unaffected finger images (examples of unaffected part images) and paralyzed finger images (examples of paralyzed part images) representing the movement of the unaffected fingers and the paralyzed fingers of the patient, respectively, as quasi-3D images based on the first data and the second data, and displaying the quasi-3D images on the display device 18.

The display control unit 164 is also capable of generating an image of a graph showing the open/closed levels (finger flexion angles θ, described below) of the fingers of the left and right hands, and displaying the image on the display device 18.

The display control unit 164 can also exaggerate the movement of the paralyzed finger images and the movement of the graph displayed on the display device 18 by a magnification level that is a preset parameter so as to appear greater than the actual movement of the paralyzed fingers. The display control unit 164 can also display messages of encouragement to the patient on the display device 18.

The audio output control unit 166 is capable of outputting, via the speaker 20, a voice encouraging the patient undergoing rehabilitation or sounds having characteristics that vary according to the movement of the paralyzed fingers.

It is noted here that the image processing unit 161, drive control unit 162, display control unit 164, and audio output control unit 166 described above are realized by a program executed by a CPU built into the control device. The control device 16 also functions as a control means that, via the program executed by the control device 16, controls the glove 12 according to the movement of the unaffected fingers detected by the sensor unit 14.

The display device 18 is, for example, a liquid crystal display or a head-mounted display, and is connected to the control device 16. Information such as images generated by the display control unit 164 of the control device 16 is displayed on the display device 18 while the patient is undergoing rehabilitation.

Specifically, the unaffected finger images and paralyzed finger images are displayed as quasi-3D moving images of the fingers in an area 182U in the upper part of the screen of the display device 18. A bar graph with side-by-side bars showing the open/closed levels (finger flexion angles θ, described below) of the fingers of the left and right hands is displayed in an area 182L in the lower part of the screen of the display device 18. The bars of the bar graph grow and shrink as the corresponding fingers open and close.

The open/closed levels of the fingers of the left and right hands may also be displayed as numerical values or time series charts near the corresponding bars. The bar graph may be any chart that is optimal for the patient.

The speaker 20 is connected to the control device 16. A voice or sound generated by the audio output control unit 166 of the control device 16 is outputted from the speaker 20 while the patient is undergoing rehabilitation.

In accordance with this rehabilitation assistance system 10, when the patient moves the unaffected fingers while wearing the glove 12 on the paralyzed fingers, force is applied by the glove 12 so as to move the paralyzed fingers in imitation of the movement of the unaffected fingers.

The rehabilitation assistance system 10 is configured so that the reaction time delay from when the patient moves the unaffected fingers to when the paralyzed fingers move is less than or equal to a predetermined length of time Td. This predetermined length of time Td is a length of time that will not feel unnatural to the patient undergoing treatment, and is preferably as short as possible. Specifically, the length of time Td is 1,000 ms or less, preferably 500 ms or less, and even more preferably 300 ms or less.

Next, the detailed operation (rehabilitation method) of the rehabilitation assistance system 10 will be described.

Figure 3:
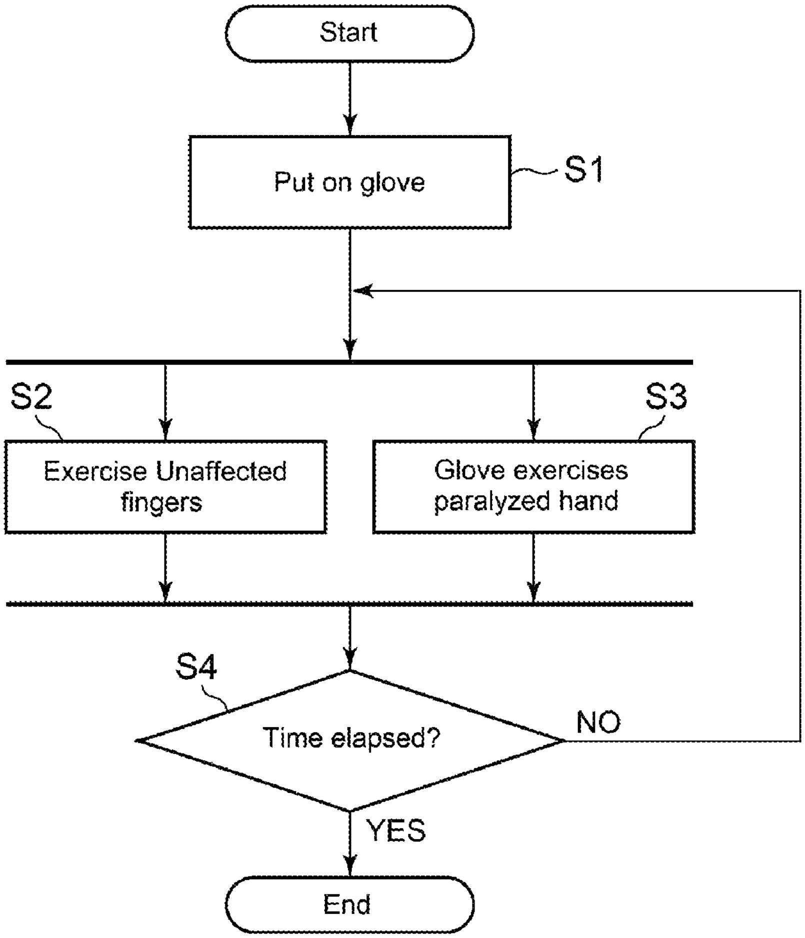
FIG. 3 is a flowchart illustrating a rehabilitation method using the rehabilitation assistance system.

The rehabilitation assistance system 10 is used in accordance with the following steps S1-S4 shown in FIG. 3 to perform rehabilitation of a patient.

When step S2 is initiated in FIG. 3, step S3 is initiated after the aforementioned reaction time delay has elapsed. Accordingly, steps S2 and S3 are executed as substantially parallel processes rather than fully parallel processes.

(Step S1)

The glove 12 is placed on the paralyzed fingers of the patient.

(Step S2)

The patient repeatedly exercises the fingers within the detection range of the sensor 14 for a predetermined length of time, making identical movements with the left and right fingers. This finger exercise (rehabilitation) is a flexion exercise in which all the fingers are clenched and released.

(Step S3)

The movement of the unaffected fingers performing the flexion exercise is obtained by the image processing unit 161 of the control device 16 via the sensor 14 as the aforementioned first data and second data, and the drive control unit 162 outputs a control signal to the glove drive device 13 so that the paralyzed fingers move in imitation of the movement of the unaffected fingers.

While the patient is repeating the exercise, the movements of the left and right hands performing the exercise are displayed as quasi-3D moving images in the display area 182U in the upper part of the screen of the display device 18, and a bar graph representing the open/closed levels (finger flexion angles θ, described below) of the fingers of the left and right hands is displayed in the display area 182L in the lower part of the screen.

Thus, while the patient watches the quasi-3D moving images and graph of the patient repeated performing the flexion exercise displayed on the display device 18, the glove 12 applies force so that the paralyzed fingers perform the same flexion exercise as the unaffected fingers, and the patient performs the hand exercise while maintaining a volitional intent to move the paralyzed fingers.

The patient may also perform rehabilitation while only looking at the movements of the unaffected and paralyzed fingers, without looking at the quasi-3D moving images of the fingers displayed on the display device 18.

While step S3 is being carried out, messages of encouragement generated by the display control unit 164 are displayed on the display device 18 to keep up the patient's motivation for rehabilitation.

When rehabilitating a patient who is incapable of opening and closing the paralyzed fingers to a great extent due to strong contracture, the displayed movement of the paralyzed finger images and the movement of the graph are exaggerated by a magnification level preset in the control device so as to appear greater than the actual movement of the paralyzed fingers.

Thus, even a patient with strong contracture is made to form a volitional intent to move the paralyzed fingers, and the resulting kinesthetic sensations are fed back to the cerebrum.

For patients with strong contracture, the stimulation device 15 applies stimulation to the patient to make the paralyzed fingers easier to move.

When rehabilitating a visually impaired patient, the audio output control unit 166 of the control device 16 outputs, via the speaker 20, sounds having characteristics (frequency and/or amplitude) that vary according to the movement of the paralyzed fingers.

Specifically, the audio output control unit 166 performs conversion to sounds having frequency characteristics that vary within an audible range of 20 Hz to 20 kHz in response to changes in the speed or acceleration of the paralyzed fingers, thereby allowing the patient to aurally perceive the movement state of the fingers.

Amplitude may be used instead of frequency, or both frequency and amplitude may be altered. The audio output control unit 166 may also output a synthesized voice that encourages the patient according to the movement of the paralyzed fingers.

As a result, even a visually impaired patent is capable of undergoing rehabilitation without relying on the information displayed on the display device 18.

(Step S4)

The aforementioned steps S3 and S4 are repeated until a predetermined length of time elapses.

After the predetermined length of time elapses, the patient's rehabilitation session is ended.

In other words, the rehabilitation method performed using the rehabilitation assistance system 10 includes a first step (the aforementioned step S2) in which the patient moves the unaffected fingers, and a second step (the aforementioned step S3) in which an assistive means worn on the paralyzed fingers apply force to the paralyzed fingers to imitate the movement of the unaffected fingers, and the patient performs the first step and the second step while watching the movement of at least one of the unaffected fingers and the paralyzed fingers.

Through this rehabilitation method, rehabilitation having high therapeutic efficacy is provided.

Next, the effects of rehabilitation performed using the rehabilitation assistance system 10 will be shown, and the rehabilitation assistance system 10 will be further described.

The inventors had an incipient stroke patient having paralysis of the right fingers perform an approximately 20-minute rehabilitation session using the rehabilitation assistance system 10, and measured the state of the patient when performing ten repetitions of a flexion exercise of clenching and releasing all of the fingers before and after the rehabilitation session.

A power-assisted fingers (manufactured by LAP Co., Ltd.) was used for the glove 12 and glove drive device 13 of the rehabilitation assistance system 10, and a Leap Motion Controller (manufactured by Leap Motion, Inc.) was used for the sensor unit 14 (hardware).

The results are shown in FIGS. 4 and 5. In the drawings, the horizontal axis is time t (ms), and the vertical axis is finger flexion angle θ (deg). As shown in FIG. 6, the finger flexion angle θ is an angle complementary to an angle α formed by a straight line extending in the longitudinal direction of the distal phalanx and a straight line extending in the longitudinal direction of the proximal phalanx. Thus, the finger flexion angle θ is larger when the finger is flexed, and smaller when the finger is extended in the opposite direction.

Figure 4A:
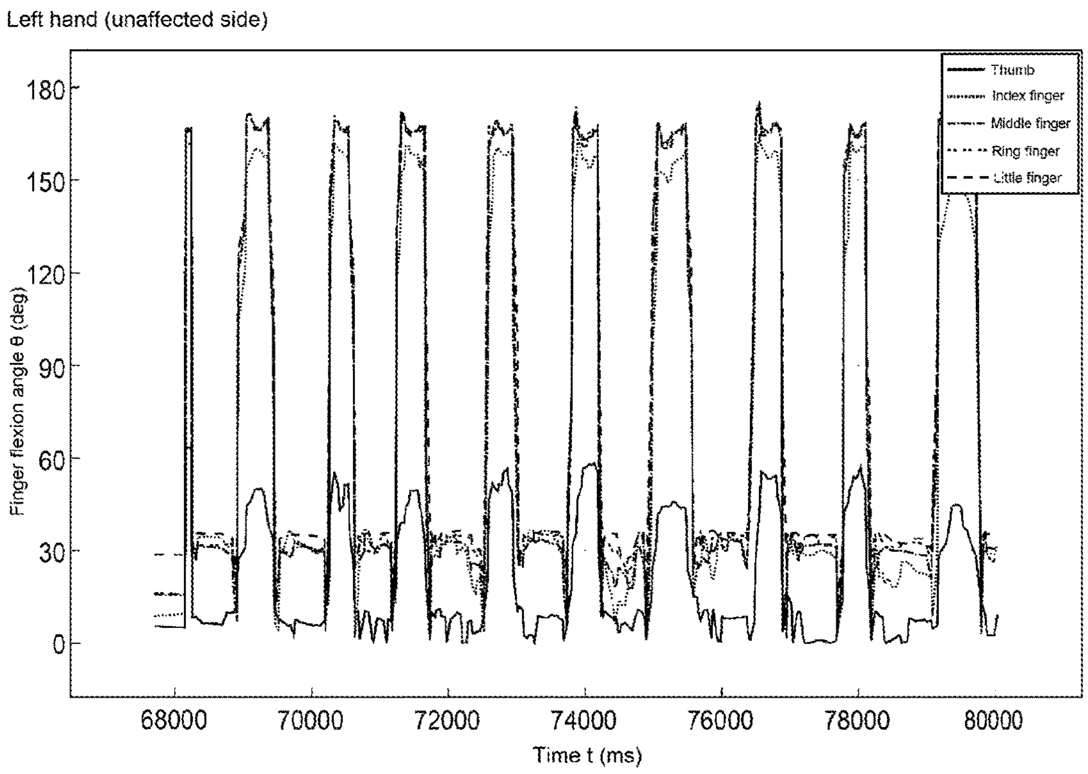
FIGS. 4A and 4B are graphs respectively showing the movement state of the left hand (unaffected side) and the movement state of the right hand (paralyzed side) before performing rehabilitation using the rehabilitation assistance system.
Figure 4B:
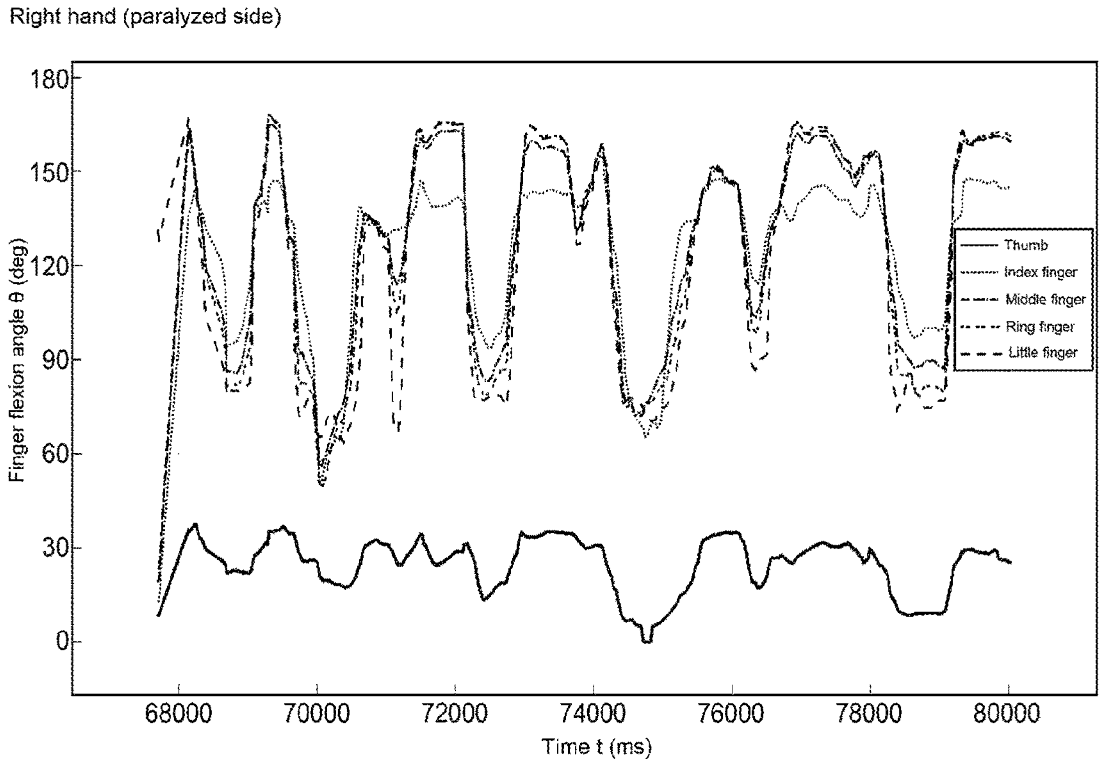

As shown in FIGS. 4A and 4B, smooth flexion of the right fingers (paralyzed) corresponding to the movement of the left fingers (unaffected) was not observed before rehabilitation.

Figure 5A:
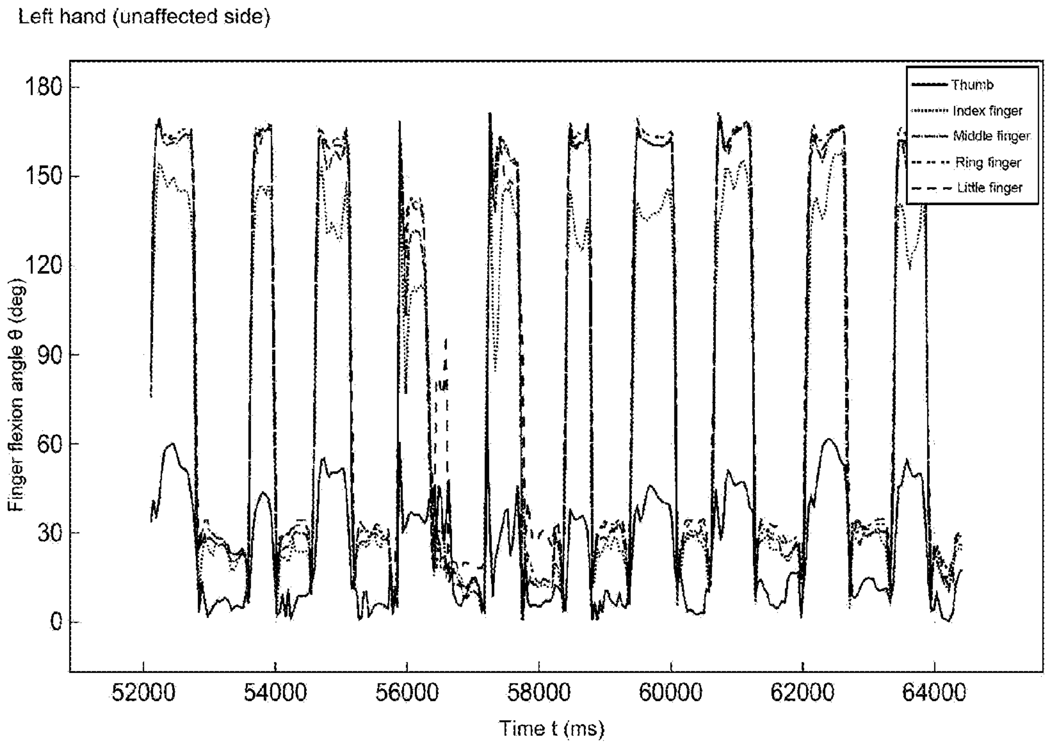
FIGS. 5A and 5B are graphs respectively showing the movement state of the left hand (unaffected side) and the movement state of the right hand (paralyzed side) after performing rehabilitation using said rehabilitation assistance system.
Figure 5B:
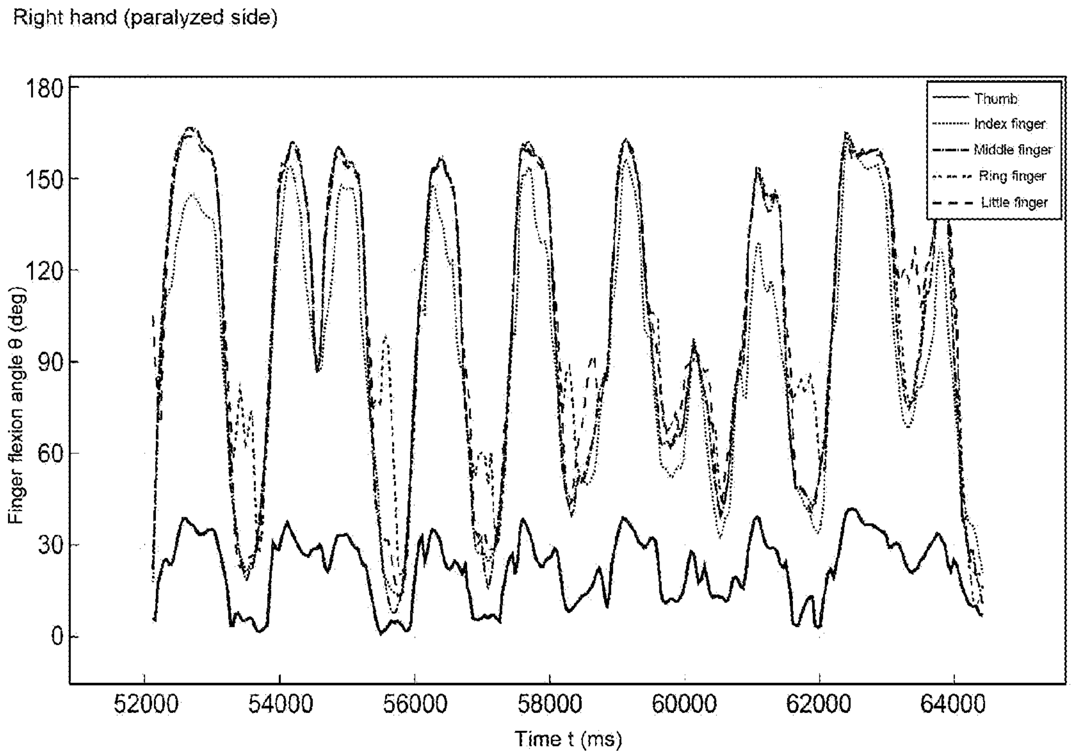
Figure 6:
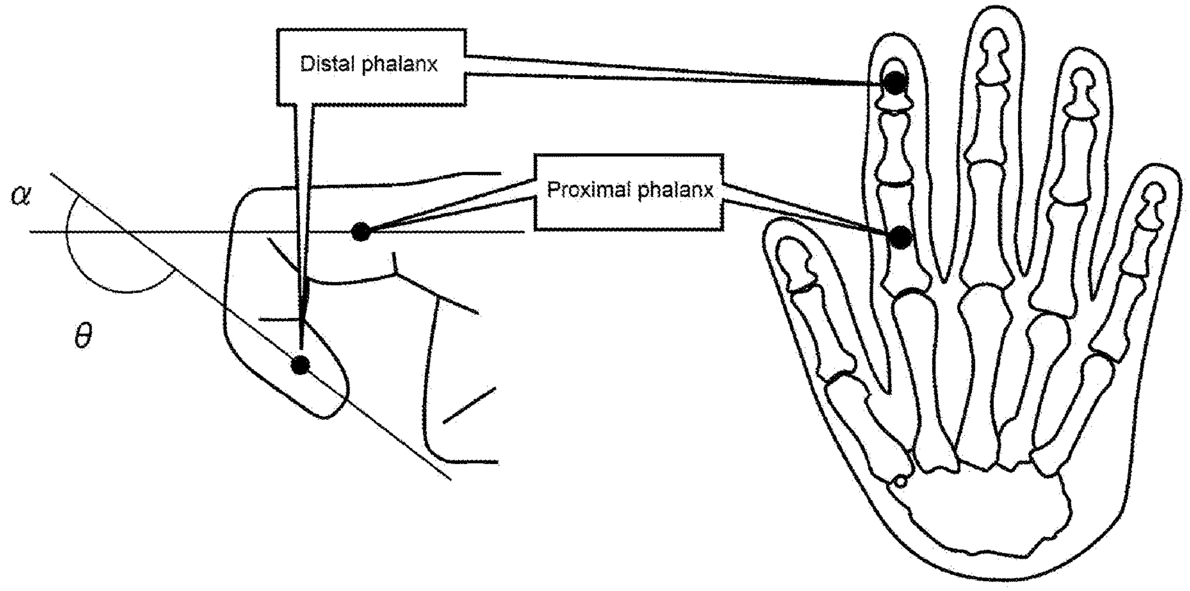
FIG. 6 is an illustration of a finger flexion angle $\theta$.

Meanwhile, rhythmic flexion corresponding to the movement of the left fingers (unaffected side) was demonstrated in the right fingers (paralyzed side) after rehabilitation, as shown in FIGS. 5A and 5B.

In other words, it was discovered that rehabilitation performed using the rehabilitation assistance system 10 promoted recovery of function in the paralyzed fingers.

It is hypothesized that the mechanism by which rehabilitation performed using the rehabilitation assistance system 10 promotes recovery of function in the paralyzed fingers is as follows.

(1) When the patient makes a spontaneous conscious attempt to move the unaffected fingers, the region of the motor cortex of the cerebral cortex that governs the target muscle fires (activates). This produces movement in the target fingers.

(2) The movement state (status) of the unaffected fingers is fed back to the sensory cortex and related regions via the sensory nerves of the patient.

(3) Based on information on the movement of the unaffected fingers obtained through contactless detection, the glove 12 worn on the paralyzed fingers applies motive force to the paralyzed fingers so as to imitate the movement of the unaffected fingers. The resulting movement state of the paralyzed fingers travels to the cerebrum as information synchronized with the unaffected fingers that constitutes sensations from the paralyzed fingers.

(4) The movement state of the fingers is visualized directly or using the display device 18, and is fed back to the various parts of the cerebrum through the visual sense of the patient.

(5) The abovementioned state is realized with a reaction time (length of time Td or less) that does not feel unnatural to the patient.

(6) As a result, sensory information (including traces of movement information) for the paralyzed fingers and visual information are added to the intention of movement and sensory information for the unaffected fingers caused by the movement of the unaffected fingers, ultimately creating a state in which the patient is presented with happiness (a strong reward to the brain) that the paralyzed fingers have moved, even though the movement of the paralyzed fingers are actually due to the action of the glove 12.

In other words, an illusion accompanied by a reward in the form of being able to move the paralyzed fingers through the patient's own volition is created in the patient's brain, prompting new construction or reconstruction of the brain network.

In this way, recovery of function in the paralyzed fingers is promoted by the rehabilitation assistance system 10 according to the present embodiment.

The foregoing has been a description of an embodiment of the present invention. However, the present application is not limited to the embodiment described above, and all modifications of conditions, etc., that do not depart from the spirit of the present invention fall within the scope thereof.

The rehabilitation assistance system is not limited to recovery of finger function. It is also possible to promote recovery of function in paralyzed toes by providing the rehabilitation assistance system with an assistive unit that can be worn on paralyzed toes in place of the glove 12, a sensor unit that detects movement of an unaffected part (unaffected toes) corresponding to the paralyzed toes, and a drive control unit that controls the assistive unit according to the movement of the unaffected part.

Alternatively, it is also possible to promote recovery of function in a paralyzed limb by providing the rehabilitation assistance system with an assistive unit that can be worn on a paralyzed limb (upper limb or lower limb) in place of the glove 12, a sensor unit that detects movement of an unaffected part (unaffected limb) corresponding to the paralyzed limb, and a drive control unit that controls the assistive unit according to the movement of the unaffected part.

In other words, it is possible to promote recovery of function in a paralyzed part by providing the rehabilitation assistance system with an assistive unit for applying force to move a paralyzed part, a sensor unit for detecting movement of an unaffected part corresponding to the paralyzed part, and a drive control unit for controlling the assistive unit according to the movement of the unaffected part detected by the sensor unit.

DESCRIPTION OF THE REFERENCE NUMBERS

10: Rehabilitation assistance system
12: Glove
13: Glove drive device
14: Sensor unit
15: Stimulation device
16: Control device
18: Display device
20: Speaker
122: Bellows
124: Tube
126: Manifold
132: Tube
161: Image processing unit
162: Drive control unit
164: Display control unit
166: Audio output control unit
182U: Upper area
182L: Lower area

What is claimed is:

1. A rehabilitation assistance system comprising:

a glove worn on the hand on a paralyzed side of a patient for applying force to move fingers on the paralyzed side;

a sensor unit comprising an irradiator for emitting infrared radiation, and infrared cameras for acquiring images of fingers on an unaffected side of the patient and the fingers on the paralyzed side of the patient; and a drive control unit for controlling the glove such that the fingers on the paralyzed side move in imitation of the movement of the corresponding fingers on the unaffected side detected by the sensor unit.

2. The rehabilitation assistance system according to claim 1, further comprising a stimulation device for applying stimulation to the patient to relieve contracture of the fingers on the paralyzed side.

3. The rehabilitation assistance system according to claim 1, wherein the glove is operated by pneumatic pressure.

4. The rehabilitation assistance system according to claim 1, further comprising a stimulation device for applying stimulation to the patient to relieve contracture of the fingers on the paralyzed side, wherein the glove is operated by pneumatic pressure.

5. The rehabilitation assistance system according to claim 1, further comprising a display control unit for displaying, on a display device, a paralyzed part image representing the movement of the fingers on the paralyzed part side detected by one of the infrared cameras.

6. The rehabilitation assistance system according to claim 1, wherein the sensor unit detects movement of the paralyzed part, and the system further comprising:

a display control unit for displaying, on a display device, an unaffected part image representing the movement of the fingers on the unaffected side detected by one of the infrared cameras and a paralyzed part image representing the movement of the fingers on the paralyzed side detected by one of the infrared cameras.

7. The rehabilitation assistance system according to claim 5 or 6, wherein the display control unit displays the paralyzed part image as a quasi-3D moving image of fingers.

8. The rehabilitation assistance system according to claim 7, wherein the display control unit displays the paralyzed part image so that the movement of the fingers on the paralyzed side in the image is greater than the movement of the fingers on the paralyzed side.

9. The rehabilitation assistance system according to claim 8, wherein the display control unit displays, on the display device, a graph or a numerical value indicating the magnitude of the movement of the fingers on the paralyzed side.

10. The rehabilitation assistance system according to claim 5, wherein the display control unit displays a message of encouragement to the patient on the display device.

11. The rehabilitation assistance system according to claim 5, further comprising:

an audio output control unit for outputting, via a speaker, a voice encouraging the patient.

12. The rehabilitation assistance system according to claim 11, wherein the audio output control unit outputs a sound having characteristics that vary according to the movement of the fingers on the paralyzed side.

13. A non-transitory computer readable storage medium for storing a program for causing a control device of a rehabilitation assistance system, the system comprising a glove worn on the hand on a paralyzed side of a patient for applying force to move fingers on the paralyzed side; and a sensor unit comprising an irradiator for emitting infrared radiation, and infrared cameras for acquiring images of fingers on an unaffected side of the patient and the fingers on the paralyzed side of the patient, to control the glove such that the fingers on the paralyzed side move in imitation of the movement of the corresponding fingers on the unaffected side detected by the sensor unit.

14. A control device for a rehabilitation assistance system, the system comprising:

a glove worn on the hand on a paralyzed side of a patient for applying force to move fingers on the paralyzed side; and a sensor unit comprising an irradiator for emitting infrared radiation, and infrared cameras for acquiring images of fingers on an unaffected side of the patient and the fingers on the paralyzed side of the patient, wherein the control device controls the glove such that the fingers on the paralyzed side move in imitation of the movement of the corresponding fingers on the unaffected side detected by the sensor unit.

* * * * *